United States Patent

Spies

[15] 3,678,412

[45] July 18, 1972

[54] FREQUENCY STABLE BLOCKING OSCILLATOR

[72] Inventor: Rolf E. Spies, Lyons, Ill.

[73] Assignee: Motorola, Inc., Franklin Park, Ill.

[22] Filed: Feb. 10, 1971

[21] Appl. No.: 114,391

[63] Continuation of Ser. No. 873,942, Nov. 4, 1969, Abandoned

[52] U.S. Cl. .......... 331/112, 331/146
[51] Int. Cl. .......... H03k 3/30
[58] Field of Search .......... 331/112, 146, 147, 148, 149

*Primary Examiner*—John Kominski
*Attorney*—Mueller & Aichele

[57] ABSTRACT

A frequency stable blocking oscillator using a timing capacitor to control the conduction of a transistor amplifier includes a transformer having a primary winding connected to the collector electrode of the transistor and a secondary winding connected between the timing capacitor and the base of the transistor. Upon conduction of the transistor, the voltage induced in the secondary winding is applied to a diode connected to the capacitor to produce a bucking voltage in opposition to and proportional to the magnitude of the DC operating voltage supplied to the oscillator. This bucking voltage establishes the starting charge on the capacitor, with a reduced bucking voltage being applied to the capacitor for a drop in the operating voltage and with an increased bucking voltage being applied to the capacitor when the operating voltage rises, thereby stabilizing the frequency of operation of the oscillator irrespective of variations of the operating or supply voltage.

8 Claims, 2 Drawing Figures

INVENTOR.
ROLF E. SPIES

BY Mueller, Aichele & Rauner
ATTORNEYS.

FREQUENCY STABLE BLOCKING OSCILLATOR

RELATED APPLICATION

This application is a continuation of application, Ser. No. 873,942, filed Nov. 4, 1969, now abandoned.

BACKGROUND OF THE INVENTION

Blocking transistor oscillators using a timing capacitor and a transistor switch device are widely used in a variety of applications. These blocking oscillators, however, possess the disadvantage of being sensitive to supply voltage changes, resulting in major frequency variations of the operation of such oscillators. In order to overcome this disadvantage, it generally is necessary to use such oscillators with a stabilized supply voltage. Stabilized supply voltages, however, are relatively expensive; so that it is desirable to stabilize the operating frequency of transistor blocking oscillators without resorting to stabilized supply voltages.

SUMMARY OF THE INVENTION

Accordingly it is an object of this invention to provide an improved blocking oscillator circuit.

It is a further object of this invention to stabilize the frequency of a blocking oscillator by deriving a feedback voltage from the output of the oscillator for controlling the starting charge on the timing capacitor of the oscillator in accordance with the supply voltage variations.

In accordance with a preferred embodiment of this invention, a frequency stable blocking oscillator includes a three-element semiconductor switch and a timing capacitor which is provided with a charging path from a source of operating potential. When the timing capacitor reaches a predetermined charge relative to a point of reference potential, the semiconductor switch is rendered conductive to discharge the timing capacitor. During the time the switch is rendered conductive, a control potential is derived from the output thereof and is applied to the timing capacitor to establish the starting charge on the timing capacitor for each cycle of operation. This control potential is proportional to the magnitude of the operating potential and is in opposition thereto, so that when the operating potential drops, the opposing control potential is less. When the operating potential increases, the opposing control potential is greater to stabilize the length of time required to charge the timing capacitor to the predetermined magnitude.

DETAILED DESCRIPTION

Figure 1:
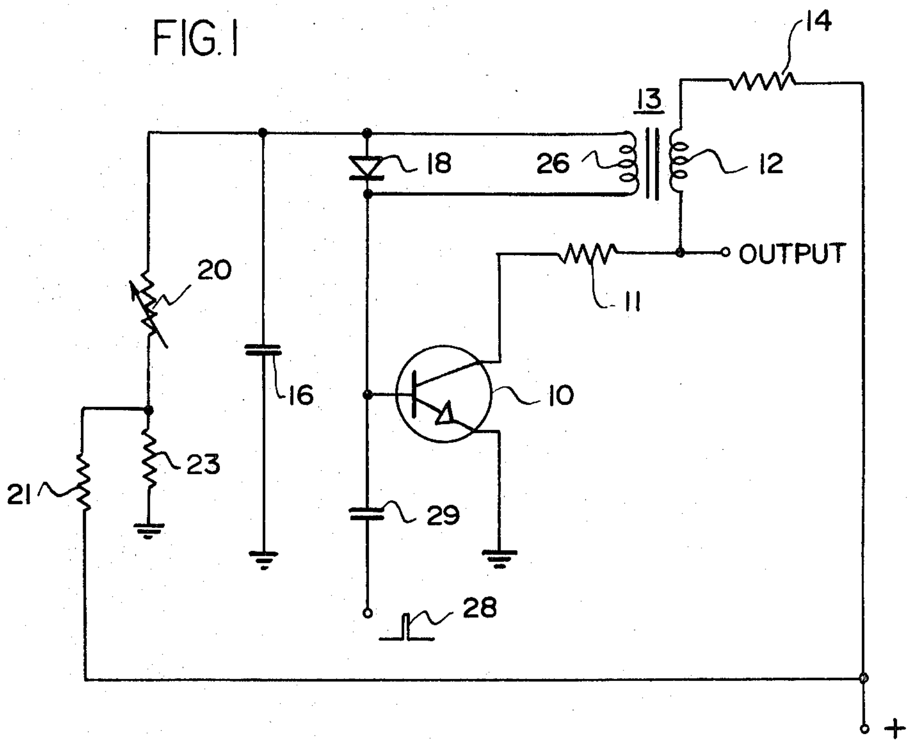
FIG. 1 is a schematic diagram of a blocking oscillator in accordance with a preferred embodiment of this invention.

Referring now to FIG. 1, there is shown a transistor blocking oscillator including an NPN transistor 10, the emitter of which is connected to ground, acting as a point of reference potential, and the collector of which is connected through a first resistor 11, the primary winding 12 of a transformer 13 and a second resistor 14 to a source of positive operating potential. The timing capacitor 16 for the oscillator circuit is connected between ground and the base of the transistor 10 through a diode 18 and the secondary winding 26 of the transformer 13. The capacitor 16 also is connected through a variable resistor 20 and a resistor 21 to the source of operating postential to provide a charging path for the capacitor 16.

The proportion of the available positive potential which is utilized for charging the capacitor 16 is determined by a voltage divider consisting of the resistor 21 and a further resistor 23 connected between ground and the junction of the resistors 20 and 21. In the circuit described thus far, the capacitor 16 is charged at a rate determined by the setting of the variable resistor 20 toward the value of the positive potential at the junction of the resistors 21 and 23. When the potential on the capacitor 16 applied through the diode 18 to the base of the transistor 10 becomes sufficiently positive to forward bias the transistor 10, the transistor conducts, with the capacitor 16 discharging through the base-emitter path of the transistor.

Upon completion of the discharge, the transistor 10 once again is rendered non-conductive and the cycle repeats. This is the conventional operation of a blocking oscillator of this type. Such a blocking oscillator, however, is highly subject to frequency variations upon variations in the potential of the supply voltage, since changes in this potential cause a change in the rate at which the timing capacitor 16 is charged to the forward biasing potential of the transistor 10.

In order to cause the oscillator circuit shown in FIG. 1 to operate at a frequency which is substantially independent of relatively wide variations in the value of the power supply voltage, the diode 18 has been provided. The secondary winding 26 on the transformer 13 is connected across the diode 18 and when the transistor 10 conducts, the current flowing through the collector-emitter path also flows through the primary winding of the transformer 12 inducing a current in the secondary winding 26. The relative polarities of the voltages in the primary and secondary windings of the transformer 13 during the conduction of the transistor 10 are indicated by the dots in FIG. 1. Thus, during the conduction of the transistor 10, the diode 18 is back-biased and the lower end of the winding 26 is clamped to a potential slightly above ground through the base-emitter junction of the transistor 10. The upper end of the winding 26 then reaches a negative potential, the value of which is dependent upon the turn ratio of the windings 12 and 26, with this negative potential being applied to the capacitor 16 as the starting voltage for the next cycle of operation.

Upon termination of conduction of the transistor 10, the flux in the windings of the transformer 13 collapses and the diode 18 operates to dissipate or short-circuit the current generated by the flux collapse in the winding 26. It should be noted that the negative potential to which the capacitor 16 is charged by the action of the winding 26 during the flux build-up caused by conduction of the transistor 10 is directly portional to the magnitude of the supply voltage, since the current flowing through the primary winding 12 is directly proportional to the value of this supply voltage. In addition, it should be noted that this negative potential, obtained from the winding 26 during conduction of the transistor 10, is in opposition to the positive potential applied as the charging potential from the junction of the resistors 21 and 23 in the voltage divider connected across the supply voltage.

The ratio of the values of the resistors 21 and 23 and the turns ratio of the windings 12 and 26 of the transformer 13 are chosen to cause a predetermined negative offset voltage to be applied to the capacitor 16 for the nominal supply voltage applied to the oscillator circuit. It is clear that this negative offset voltage is directly related to the frequency at which the oscillator will be operated. The magnitude of bucking or offset voltage is selected to be as close as possible to the magnitude of the charging potential from the junction of the resistors 21 and 23 to eliminate frequency dependency of the circuit upon the power supply magnitude.

Assume now that the supply voltage rises. This causes a higher voltage to be applied at the junction of the resistors 21 and 23 to act as the charging voltage through the resistor 20 for charging the capacitor 16. Without the feedback circuit obtained from the diode 18, this would result in a shorter charging time for the capacitor 16, thereby increasing the frequency of operation of the oscillator. When the transistor 10, however, conducts, the diode 18 furnishes an increased bias voltage in the opposite direction due to the increased current flowing through the primary winding 12 of the transformer 13. This increased negative bucking voltage, applied to the capacitor 16, causes the starting voltage of the capacitor 16 to be more negative than when the desired or nominal supply voltage exists. The amount of change in the starting voltage is sufficient to counter the change in the supply voltage. As a consequence, the total range of voltage through which the capacitor 16 must be charged to reach the forward conduction point of the transistor 10 is increased; but since a higher charging voltage exists, the time required to reach the conduction point of the transistor 10 remains constant.

If the supply voltage should decrease, the positive potential or charging voltage at the junction of the resistors 21 and 23 also decreases; and a less negative (more positive) starting voltage is applied to the capacitor 16 by the diode 18 from the secondary winding 26 of the transformer. Thus, the range of voltage through which the capacitor 16 must be charged is less; but since the charging voltage also is less, the time required to reach the forward bias potential of the transistor 10 is held constant. To adjust the frequency of operation, the resistance of the variable resistance 20 can be changed; but for any given setting of the resistor 20, a constant frequency operation is obtained.

Figure 2:
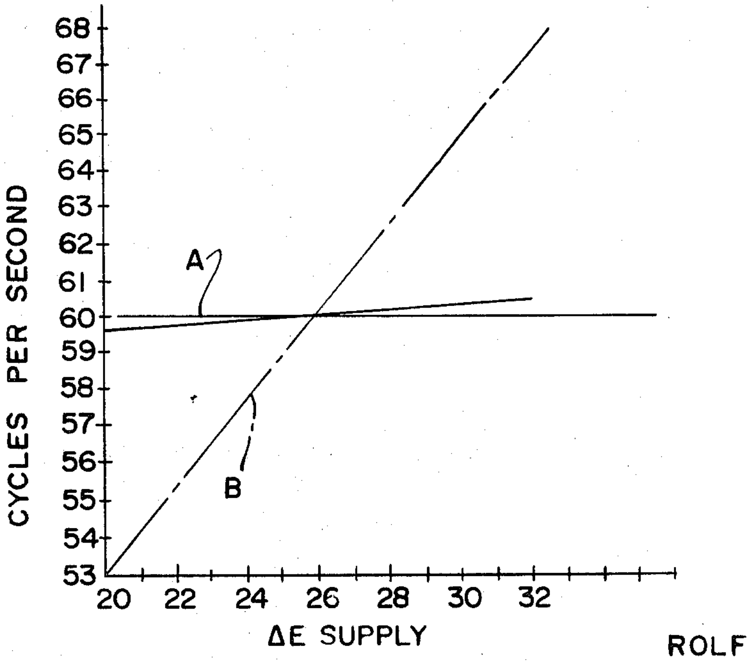
FIG. 2 is a chart illustrating the operating characteristics of the circuit shown in FIG. 1.

Referring now to FIG. 2, there is shown in line A a plot of the output frequency of an oscillator circuit, constructed in accordance with FIG. 1, over a range of operating supply voltages, with a nominal supply voltage of 25 volts, which was varied between 20 volts and 32 volts. It may be seen that for a selected operating frequency of 60 cycles per second, the variation was from 59.7 cycles per second at 20 volts to 60.3 cycles per second at 32 volts. This may be contrasted with the comparable wide variation of frequency from approximately 53 cycles per second to 67 cycles per second shown in line B of FIG. 2, which illustrates the frequency range for a conventional blocking oscillator circuit not utilizing the diode-voltage divider arrangement.

Thus, it is apparent from an examination of FIG. 2 that a highly frequency stable blocking oscillator is obtained by the use of the properly dimentioned voltage divider 21, 23 and the diode 18 added to an otherwise standard circuit. This permits use of the blocking oscillator with an unregulated DC power supply varying ± 20 percent from the nominal supply voltage.

If it is desired to synchronize the operation of the oscillator shown in FIG. 1 with an external synchronizing signal, synchronizing pulses 28 can be applied to the base of the transistor 10 through a coupling capacitor 29, with conduction of the transistor 10 then being triggered by the synchronizing pulses 28. The operation of the circuit is otherwise the same.

I claim:

1. A frequency stable blocking oscillator including in combination:
   - a timing capacitor with first and second terminals;
   - electronic switch means having at least first, second and control electrodes;
   - means for connecting the first terminal of the timing capacitor and the first electrode of the switch means to a point of reference potential;
   - means for connecting the second terminal of the timing capacitor with the control electrode of the switch means, the switch means being rendered conductive when the potential on the control electrode reaches a predetermined magnitude relative to the point of reference potential;
   - means connecting the second terminal of the timing capacitor with a source of operating potential for establishing a charging path for the capacitor; and
   - means connected with the second electrode of the switch means for supplying a control potential to the second terminal of the timing capacitor when the switch means is rendered conductive, the control potential being proportional to the magnitude of the operating potential and being in opposition thereto for establishing the starting charge on the timing capacitor for each cycle of operation of the oscillator.

2. The combination according to claim 1 wherein the means for connecting the second terminal of the capacitor to the source of operating potential includes a voltage divider connected between the source of operating potential and the point of reference potential.

3. The combination according to claim 1 wherein the switch means is rendered non-conductive following discharge of the capacitor to initiate a new cycle of operation.

4. The combination according to claim 1 wherein the switch means is a transistor having emitter, collector and base electrodes corresponding to the first, second and control electrodes, respectively.

5. The combination according to claim 4 wherein the means for supplying the control potential to the second terminal of the capacitor includes a unidirectional current conducting means, and a transformer, having a primary winding and a secondary winding, the primary winding being connected between the source of operating potential and the collector of the transistor, the unidirectional current conducting means being connected across the secondary winding between the second terminal of the capacitor and the base electrode of the transistor, and wherein the potential induced in the secondary winding of the transformer during the conduction of the transistor causes the unidirectional current conducting means to apply a control potential in opposition to but proportional to the magnitude of the operating potential applied to the second terminal of the capacitor by the means connecting the second terminal of the capacitor with the source of operating potential.

6. The combination according to claim 5 wherein the means connecting the second terminal of the capacitor with the source of operating potential includes a voltage divider connected between the source of operating potential and the point of reference potential.

7. The combination according to claim 6 wherein the unidirectional current conducting means is a diode and wherein the emitter-base junction of the transistor and the polarity of the diode are such that when the transistor conducts, the diode is reverse biased by the polarity appearing across the secondary winding of the transformer, and when the flux collapses in the secondary winding of the transformer, the emitter-base junction of the transistor is reverse-biased and the diode is forward-biased.

8. The combination according to claim 7 wherein the transistor is an NPN transistor and the point of reference potential is ground potential, with the source of operating potential being a DC source subject to variation.

* * * * *